C. CARSON.
PORTABLE ELECTRIC LAMP HOLDER.
APPLICATION FILED FEB. 24, 1915.
1,224,864.
Patented May 1, 1917.
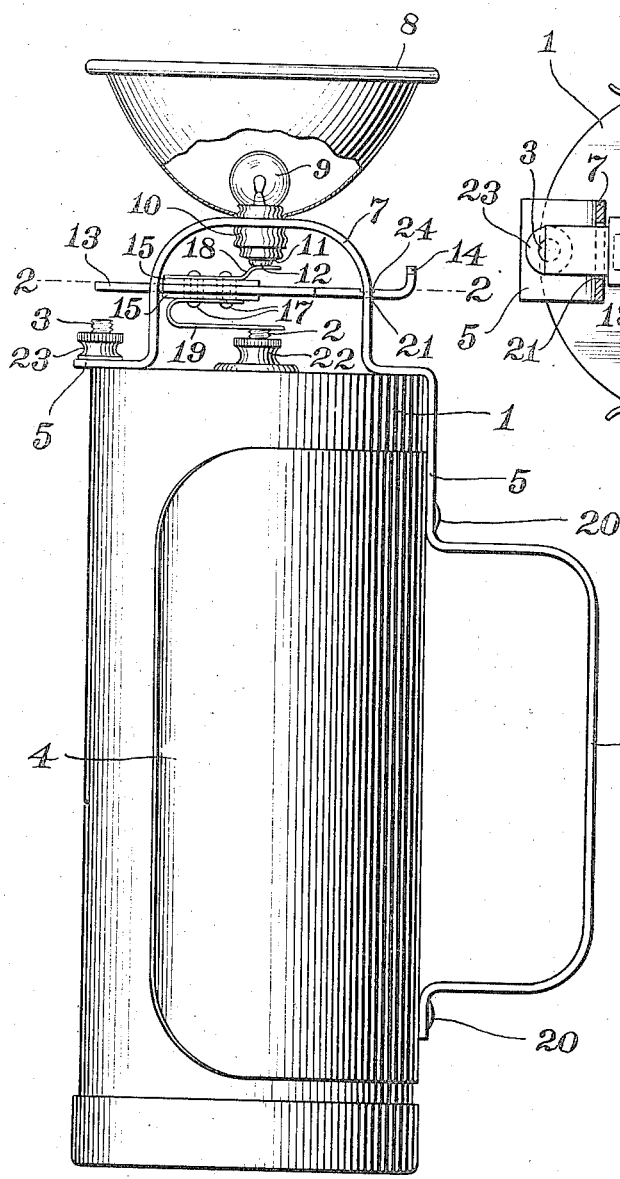
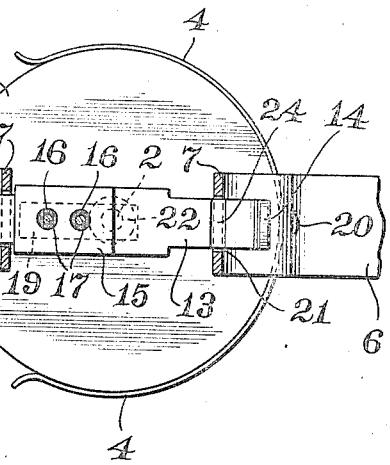
Witnesses:
B. G. Crawford
J. B. Schmitt
Inventor
Clarence Carson
By his Attorney

UNITED STATES PATENT OFFICE.

CLARENCE CARSON, OF NEW YORK, N. Y., ASSIGNOR TO H. W. JOHNS-MANVILLE COMPANY, A CORPORATION OF NEW YORK.

PORTABLE-ELECTRIC-LAMP HOLDER.

1,224,864.

Specification of Letters Patent.

Patented May 1, 1917.

Application filed February 24, 1915. Serial No. 10,243.

*To all whom it may concern:*

Be it known that I, CLARENCE CARSON, a citizen of the United States of America, residing at New York city, county and State of New York, have invented certain new and useful Improvements in Portable-Electric-Lamp Holders, of which the following is a specification.

My invention relates to portable electric lamps generally and is more particularly designed to afford a convenient holder for small incandescent electric lamps, into which holder a standard cell of dry battery can be fitted and the completed structure transported and manipulated for light giving purposes without subjecting the battery poles to any strain other than that necessary for securing good electrical connections.

It has been proposed heretofore to mount such small electric lamps on dry batteries and provide a handle by which such completed structure can be held in use and transportation, but in such prior devices the binding screws and poles of the battery have been utilized as the sole means of mechanical attachment of the lamp holder to the battery cell, with the result that these somewhat fragile connections soon become loosened and the continuity of the electrical circuit destroyed or impaired. I have overcome this difficulty by so designing the holder that the body of the battery shell is firmly grasped by spring clips or other frictional devices which support the weight, and only such contact with the battery terminals is employed as is necessary to insure electric conductivity. The best form of apparatus at present known to me embodying my invention is illustrated in the accompanying sheet of drawings in which, Figure 1 is a side elevation of the complete apparatus, parts being broken away, with battery and lamp in position, and Fig. 2 is a horizontal section on line 2—2 of Fig. 1.

Throughout the drawings like reference characters indicate like parts.

1, represents a standard form of dry battery cell having a cylindrical shell, a central pole 2, in shape of a contact screw, and a similar peripheral pole 3. My improved form of lamp and battery holder comprises a shield 4 formed preferably of a sheet of spring steel shaped to hug the battery shell and extend around about two thirds of the circumference thereof, a metal strip 5, bent outwardly to form a convenient handle 6, as shown in Fig. 1, fastened to the shield 4, as by rivets 20, 20, having its free end bent up over the end of the battery in U-shaped formation 7, to serve as a support for lamp socket 10, and reflector 8, and perforated to receive the peripheral binding screw 3, of the battery.

9, is a small incandescent electric lamp, the base of which is screwed into, and through, the open-ended, internally threaded metal shell 10, which forms its supporting socket, the central plug or terminal 12, and its surrounding insulation 11, projecting below the bottom of the socket.

13, is a switch bar, or sliding member, which may be of metal, and is loosely mounted on the U-shaped portion 7, of the metal strip, as by passing through slots 21, 21, therein. The end of this bar 13, nearest the handle 6, may be bent up as shown at 14, to serve as a convenient means for manipulating the bar by the thumb of the hand grasping handle 6. This switch bar carries an independent electrical conductor adapted to complete the circuit from central battery pole 2, to central lamp terminal 12. This conductor may consist of an upper spring contact 18, and lower spring contact 19, electrically connected by bolts or rivets 17, 17, passing through bar 13, all parts being insulated from bar 13, by sheets of insulation 15, 15, and thimbles or bushings 16, 16. The switch bar may have a notch 24 in its upper surface to engage the strip 5, as shown in Fig. 1.

In use the parts are arranged as shown, the binding nut 23, on peripheral pole 3, being preferably screwed down on the end of strip 5, while binding nut 22, on central pole 2, is preferably screwed down as shown so as to leave the upper end of the binding screw projecting therethrough. One or both of these binding nuts may be dispensed with. Hence the lamp holder is still operative with batteries from which the binding nuts have been lost. When the parts are in the position shown in the drawings the circuit leads from one pole of battery 1, as from peripheral pole 3, through half of the U-shaped portion 7, of strip 5, to shell 10, of the lamp socket, thence through the lamp and out by central terminal 12, thereof, to contact 18, through rivets 20, 20, to contact 19, and central pole 2, back to the battery. When the sliding member, or switch 13, is slid to the right, contact 18, is separated from the central terminal 12, of lamp 9, and the lamp is cut out of circuit. When the battery is exhausted, binding nut 23, is removed, the battery pulled out of the spring clip formed by shield 4, a new cell of battery is substituted and the operations above described, continue.

Among the advantages of my invention may be mentioned, (in addition to the relieving of the battery terminals of all strains), the reduction of the number of parts to a minimum, simplicity of switch and ease of operation by the hand holding the apparatus, and the vertical direction of light rays produced, as a result of which last mentioned feature a user can conveniently throw the full light on the underneath portion of a motor car and contained mechanism.

Various changes in details of construction of the mechanism herein shown and described could be made without departing from the principle of my invention. Other forms of friction holding clip could be substituted for the spring shield 4. The connections to the binding posts and arrangement of switch or circuit breaker might be varied. The lamp socket might be mounted at other points in the strip 5, and other similar modifications to meet special requirements made while still retaining part or all of my invention.

Having described my invention, I claim:

1. A holder for an electric lamp adapted to be attached to a battery comprising in combination a metal strip adapted to make contact with one pole of the battery, a spring clip adapted to grasp the battery shell, a socket for the lamp, in circuit with the strip, and an independent conductor carried by, but insulated from the strip and adapted to complete the circuit from the central terminal of the lamp to the other pole of the battery.

2. A holder for an electric lamp adapted to be attached to a battery comprising in combination a metal strip adapted to make contact with one pole of the battery, a spring clip adapted to grasp the battery shell, a socket for the lamp, in circuit with the strip, and an independent conductor carried by, but insulated from the strip and adapted to complete the circuit from the central terminal of the lamp to the other pole of the battery, said independent conductor being movable with reference to the strip so as to serve as a circuit opening and closing device.

3. The combination of a metal strip adapted to make contact with the peripheral pole of a battery, an internally threaded, open-ended metal shell carried by said strip adapted to serve as a socket for an incandescent electric lamp, a sliding member mounted on said strip, and a conductor mounted on said sliding member, but insulated therefrom, and having spring terminals adapted to engage the central pole of the battery and the central terminal of the lamp.

4. The combination of a curved sheet of spring metal adapted to grasp a dry battery cell, a metal strip fastened to the sheet and bent to form a handle therefor, while a free end extends over the top of battery cell in U-shaped formation with its outer end in contact with the peripheral pole thereof, a socket for an incandescent lamp mounted on and in circuit with the U-shaped portion of said strip, and a sliding member mounted on the U-shaped portion of the strip carrying a conductor insulated from the strip and provided with spring terminals which are in contact with both the central pole of the battery and the central terminal of a lamp held in the before mentioned socket when the sliding member is in one position, but one of which is out of such contact when the sliding member is in another position.

5. The combination of a metal strip adapted to make contact with the peripheral pole of a battery, an internally threaded, open-ended metal shell carried by said strip adapted to serve as a socket for an incandescent electric lamp, a sliding member mounted on said strip, and a conductor mounted on said sliding member, but insulated therefrom, and having spring terminals adapted to engage the central pole of the battery and the central terminal of the lamp, said sliding member having a notch engaging the metal strip when said sliding member is in one position.

CLARENCE CARSON.

Witnesses:
CHARLES E. HORTON,
C. B. GEORGEN.